(12) United States Patent
Bae et al.

(10) Patent No.: US 7,813,615 B2
(45) Date of Patent: Oct. 12, 2010

(54) FLEXIBLE FILM OPTICAL WAVEGUIDE USING ORGANIC-INORGANIC HYBRID MATERIAL AND FABRICATION METHOD THEREOF

(75) Inventors: Byeong-Soo Bae, Daejeon (KR); Woo-Soo Kim, Daejeon (KR); Dong-Jun Kang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 316 days.

(21) Appl. No.: 11/918,315

(22) PCT Filed: Feb. 3, 2006

(86) PCT No.: PCT/KR2006/000405

§ 371 (c)(1),
(2), (4) Date: Oct. 12, 2007

(87) PCT Pub. No.: WO2006/112592

PCT Pub. Date: Oct. 26, 2006

(65) Prior Publication Data

US 2009/0052856 A1    Feb. 26, 2009

(30) Foreign Application Priority Data

Apr. 19, 2005    (KR)    ...................... 10-2005-0032474

(51) Int. Cl.
*G02B 6/00* (2006.01)

(52) U.S. Cl. ...................................... 385/143; 385/145
(58) Field of Classification Search ................. 385/143, 385/145
See application file for complete search history.

(56) References Cited

U.S. PATENT DOCUMENTS

| 6,091,874 A | 7/2000 | Higashi et al. |
| 6,144,795 A * | 11/2000 | Dawes et al. ................. 385/141 |
| 6,496,624 B1 | 12/2002 | Hikita et al. |
| 6,727,337 B2 * | 4/2004 | Friedrich ..................... 528/24 |
| 2004/0057688 A1 * | 3/2004 | Akutsu et al. ............... 385/129 |

OTHER PUBLICATIONS

Hikita, M., et al.,"Polymeric Optical Waveguide Films for Short-Distance Optical Interconnects", *IEEE Journal of Selected Topics in Quantum Electronics*, vol. 5, No. 5, pp. 1237-1242, (pp. 1999).

* cited by examiner

*Primary Examiner*—Uyen-Chau N Le
*Assistant Examiner*—Chris H Chu
(74) *Attorney, Agent, or Firm*—The Nath Law Group; Jerald L. Meyer; Stanley N. Protigal

(57) ABSTRACT

Disclosed herein is a flexible film optical waveguide, which is in flexible film form and includes upper and lower cladding layers, each of which is formed of an organic-inorganic hybrid material, and a core layer provided between the upper and lower cladding layers and formed of an organic-inorganic hybrid material having a refractive index higher than that of the organic-inorganic hybrid material of each of the upper and lower cladding layers. In addition, a method of fabricating such a flexible film optical waveguide is also provided.

5 Claims, 2 Drawing Sheets

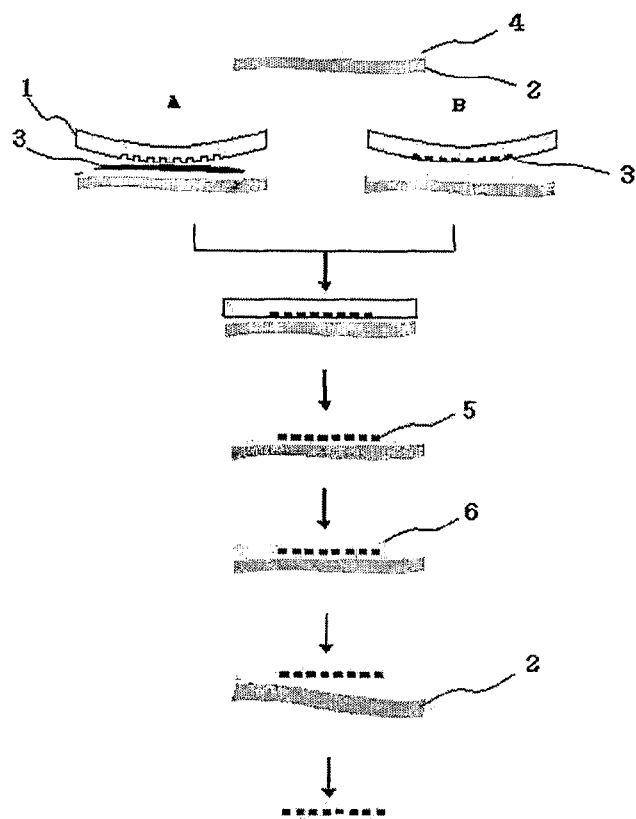
[Fig.1]
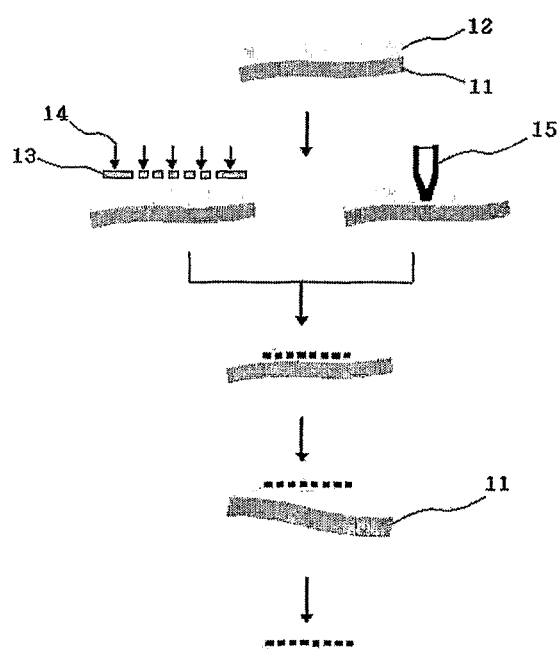
[Fig.2]

[Fig.3]
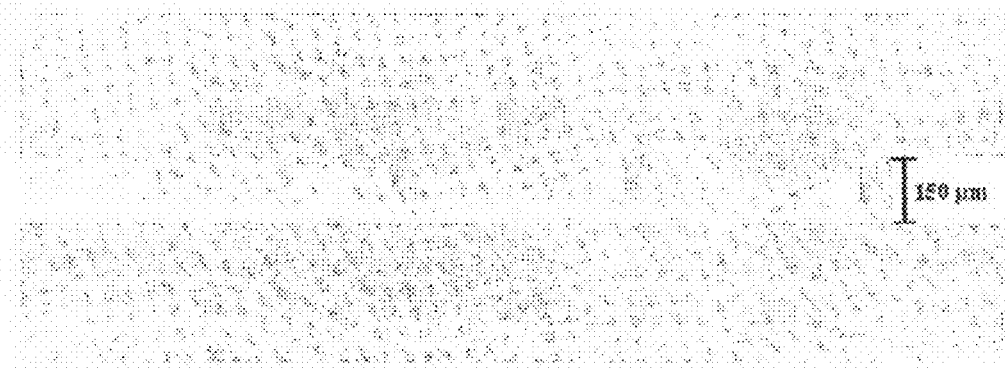
[Fig.4]
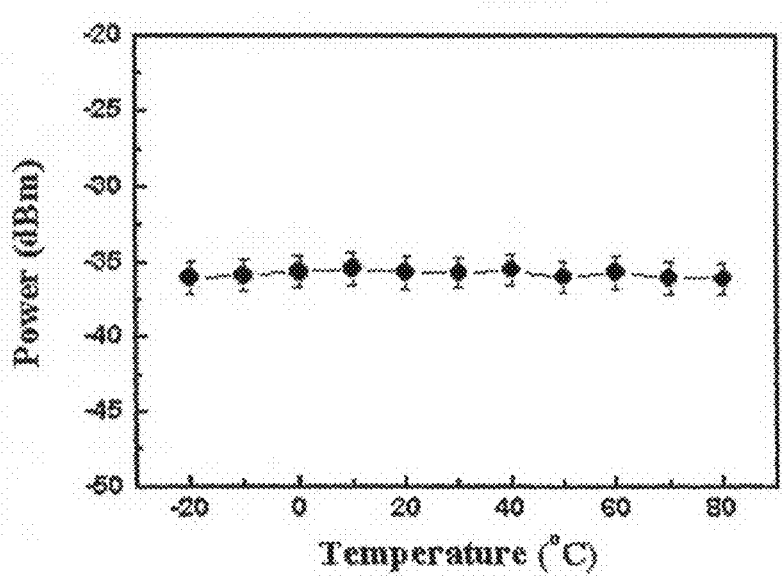
[Fig.5]

FLEXIBLE FILM OPTICAL WAVEGUIDE USING ORGANIC-INORGANIC HYBRID MATERIAL AND FABRICATION METHOD THEREOF

TECHNICAL FIELD

The present invention relates, in general, to a flexible film optical waveguide and a fabrication method thereof, and, more particularly, to a flexible film optical waveguide, which is advantageous because it has high bendability, low bending loss and high-temperature stability by forming an optical waveguide on a substrate using an organic-inorganic hybrid material having a variable refractive index as a material for each of a core layer and a cladding layer, and then removing the substrate, and to a method of fabricating such a flexible film optical waveguide.

BACKGROUND ART

In order to continuously improve speeds of computer chips and optical communication, conversion of electrical connections, which have used electrical wiring between chips or between substrates to date, into optical connections by conducting light wiring therebetween is recognized to be a very important problem. Thus, a flexible film optical waveguide, which is bendable, is receiving attention for use in light wiring to realize the optical connections, and thorough research thereon is being conducted.

Methods of fabricating such a flexible film optical waveguide using a polymer are already known. In this regard, U.S. Pat. No. 6,091,874 discloses a method of fabricating a flexible film optical waveguide from polyamide and polyimide through a photolithographic process. In addition, a method of fabricating a flexible film optical waveguide from a d-PMMA polymer material through photolithography has been reported in U.S. Pat. No. 6,496,624 and the IEEE Journal of Selected Topics in Quantum Electronics, 5[5], pp 1237-1242 (1999). In the above-reported flexible film optical waveguide fabrication method, a lower cladding layer is provided on a substrate, and a core layer is then formed on the lower cladding layer. Subsequently, a photoresist layer is formed on the core layer, exposed, and developed, to form a photoresist pattern. Using the resultant photoresist pattern, the core layer is etched and patterned. Thereafter, an upper cladding layer is formed on the patterned core layer, thereby completing an optical waveguide, which is then separated from the substrate. However, the conventional flexible film optical waveguide fabricated using a polymer material through photolithography suffers because the process is complicated, includes multiple steps, is not reliable, and entails high fabrication costs. As well, the conventional polymer flexible film optical waveguide is difficult to fabricate on a mass production, due to the low thermal stability of the polymer material.

In addition, U.S. Pat. No. 6,144,795 discloses a method of forming a single-mode optical waveguide on a silicon substrate using a sol-gel organic-inorganic hybrid material through micro embossing and stamping. However, the above patent is disadvantageous because the sol-gel organic-inorganic hybrid material is used, and thus the optical waveguide is limitedly formed only on the silicon substrate. Further, the use of the above material results in low heat resistance, high color dispersion and high light loss, and causes many problems when fabricating a multi-mode optical waveguide having a large core layer, and is thus unsuitable for the fabrication of a single- and multi-mode flexible film optical waveguide.

DISCLOSURE OF INVENTION

Technical Problem

Accordingly, the present invention has been made keeping in mind the above problems occurring in the related art, and an object of the present invention is to provide an optical waveguide, which is advantageous because it has excellent optical properties, transparency, flexibility, strength, heat resistance and stability, and has a variable refractive index.

Another object of the present invention is to provide a method of easily fabricating such an optical waveguide having the above properties from an organic-inorganic hybrid material through a simple process.

Technical Solution

In order to accomplish the above objects, the present invention provides a flexible film optical waveguide, which is in flexible film form and comprises upper and lower cladding layers, each of which is formed of an organic-inorganic hybrid material; and a core layer provided between the upper and lower cladding layers and formed of an organic-inorganic hybrid material having a refractive index higher than that of the organic-inorganic hybrid material of each of the upper and lower cladding layers.

In the flexible film optical waveguide of the present invention, the organic-inorganic hybrid material is preferably a material having a network structure formed by bonding of an oxygen atom or an organic monomer enabling network formation or network modification to silicon therein.

Preferably, the flexible film optical waveguide of the present invention has a bending loss of 1 dB/cm or less.

In the flexible film optical waveguide of the present invention, the organic-inorganic hybrid material is preferably a material obtained by condensation of the compound of Formula 1 below and the compound of Formula 2 and/or 3 below:

$$R^1R^2Si(OH)_2 \quad \text{Formula 1}$$

$$R^3_aR^4_bM(OR^5)_{(c-a-b)} \quad \text{Formula 2}$$

$$(OR^6)_nSi-(X-R^7)_m (n+m=4) \quad \text{Formula 3}$$

in Formulas 1 to 3, $R^1$, $R^2$, $R^3$ and $R^4$ are each a linear, branched or cyclic $C_{1-12}$ hydrocarbon group having a functional group selected from among an alkyl group, a ketone group, an acryl group, a methacryl group, an allyl group, an alkoxy group, an aromatic group, a halogen group, an amino group, a mercapto group, an ether group, an ester group, a sulfone group, a nitro group, a hydroxy group, a cyclobutene group, a carbonyl group, a carboxyl group, an alkyd group, a urethane group, a vinyl group, a nitrile group, hydrogen, an epoxy group, and mixtures thereof; $R^6$ is a linear or branched alkyl group having 1~10 carbons or a hydrogen atom; X is a carbon chain having 3~6 carbons; $R^7$ is fluorocarbon having a substituted fluorine atom in a carbon chain having 4~8 carbons or including a vinyl group, a glycidoxy group or a methacryl group; n is a natural number from 1 to 4; m is an integer from 0 to 3; a and b are each an integer from 0 to 3; c is an integer from 3 to 6; M is silicon or metal; and $R^5$ is a linear, branched or cyclic $C_{1-12}$ hydrocarbon having a functional group selected from among an alkyl group, an alkoxy group, a ketone group, an aromatic group, and mixtures thereof.

In the flexible film optical waveguide of the present invention, the organic-inorganic hybrid material is preferably prepared by polymerizing a homogeneous or heterogeneous compound including an organic monomer enabling network formation due to the presence of an organic group substituted for silicon, through the addition of a free radical or an organic polymerization initiator or through a ring opening reaction using metal alkoxide or an amine group.

In addition, the present invention provides a method of fabricating a flexible film optical waveguide, comprising providing a lower cladding layer formed of an organic-inorganic hybrid material on a substrate; providing a core layer formed of an organic-inorganic hybrid material having a refractive index higher than that of the organic-inorganic hybrid material of the lower cladding layer on the lower cladding layer using a mold through an embossing process or a stamping process; curing the core layer, and removing the mold; and providing an upper cladding layer formed of an organic-inorganic hybrid material on the core layer and removing the substrate.

In addition, the present invention provides a method of fabricating a flexible film optical waveguide, comprising providing a cladding layer formed of an organic-inorganic hybrid material on a substrate; radiating light onto the cladding layer in a predetermined pattern, to form a core layer having a refractive index higher than that of the cladding layer; and removing the substrate.

In the method of the present invention, the substrate preferably comprises a material selected from among metals, silicon, metal oxides, and organic polymers.

Preferably, the method of the present invention may further comprise applying a release agent on the substrate or surface treating the substrate to be hydrophobic.

In the method of the present invention, the mold may preferably be a flat type or a roll type.

Preferably, the method of the present invention may further comprise curing the optical waveguide using heat or UV light.

Advantageous Effects

According to the present invention, a flexible film optical waveguide and a fabrication method thereof are provided. Thus, the flexible film optical waveguide having low waveguide loss, low bending loss in a freely bendable state, and high stability even at high temperatures can be fabricated. Further, the fabrication method is simple, and the flexible film optical waveguide can be inexpensively fabricated on a mass production. The flexible film optical waveguide of the present invention can be applied to optical communication devices or optical connection devices.

BRIEF DESCRIPTION OF THE DRAWINGS

FIG. 1 is views sequentially showing a process of fabricating a flexible film optical waveguide using a micro embossing process and a stamping process, according to the present invention;

FIG. 2 is views sequentially showing a process of fabricating a flexible film optical waveguide by radiating light, according to the present invention;

FIG. 3 is a photograph showing the bent shape of the flexible film optical waveguide manufactured using the method of the present invention;

FIG. 4 is an optical micrograph showing the polished section of the flexible film optical waveguide manufactured using the method of the present invention; and FIG. 5 is a graph showing the variation in light loss, depending on temperature, of the flexible film optical waveguide of the present invention.

Best Mode For Carrying Out The Invention

Hereinafter, a detailed description will be given of the present invention.

The present invention provides a flexible film optical waveguide, as a waveguide able to achieve optical connection, unrealizable by conventional planar optical waveguides, characterized in that it can be applied to light wiring in narrow spaces or to optical connections that must be bent at various angles. In the flexible film optical waveguide, bending loss when freely bending the waveguide is regarded as very important, as well as low waveguide loss of the waveguide itself. In the present invention, the difference in refractive index between a core layer and a cladding layer is increased, thus assuring low bending loss even upon intensive bending.

In addition, the flexible film optical waveguide should have appropriate flexibility and strength. To this end, an organic-inorganic hybrid material is used in the present invention, thus exhibiting strength superior to that of conventional polymer materials while maintaining flexibility similar thereto.

In the present invention, the organic-inorganic hybrid material is prepared through the condensation of a compound of Formula 1 below with a compound of Formula 2 and/or Formula 3. That is, the organic-inorganic hybrid material of the present invention results from reacting silanediol of Formula 1 with a compound represented by Formula 2 and/or 3 to obtain an oligomer, which is then cured using heat or light, thus preparing a polymer type hybrid material:

$$R^1R^2Si(OH)_2 \qquad \text{Formula 1}$$

$$R^3_aR^4_bM(OR^5)_{(c-a-b)} \qquad \text{Formula 2}$$

$$(OR^6)_nSi-(X-R^7)_m (n+m=4) \qquad \text{Forumla 3}$$

In Formulas 1 to 3, $R^1$, $R^2$, $R^3$ and $R^4$ are each a linear, branched or cyclic $C_{1-12}$ hydrocarbon group having a functional group selected from among an alkyl group, a ketone group, an acryl group, a methacryl group, an allyl group, an alkoxy group, an aromatic group, a halogen group, an amino group, a mercapto group, an ether group, an ester group, a sulfone group, a nitro group, a hydroxy group, a cyclobutene group, a carbonyl group, a carboxyl group, an alkyd group, a urethane group, a vinyl group, a nitrile group, hydrogen, an epoxy group, and mixtures thereof; a and b are each an integer from 0 to 3; c is an integer from 3 to 6; M is silicon or a metal; and $R^5$ is a linear, branched or cyclic $C_{1\sim12}$ hydrocarbon group having a functional group selected from among an alkyl group, an alkoxy group, a ketone group, an aromatic group, and mixtures thereof. In addition, $R^6$ is a linear or branched alkyl group having 1~10 carbons or a hydrogen atom, and X is a carbon chain having 3~6 carbons. $R^7$ is a fluorocarbon having a substituted fluorine atom in a carbon chain having 4~8 carbons or including a vinyl group, a glycidoxy group or a methacryl group, and n is a natural number from 1 to 4 and m is an integer from 0 to 3.

The compound of Formula 1 includes, for example, diphenylsilanediol, diisobutylsilanediol, etc., and all materials included in the compound of Formula 1 may be used alone or in combinations thereof.

The compound of Formula 2 is specifically exemplified by alkoxy silanes, for example, 3-glycidoxypropyltrimethoxysilane, 3-glycidoxypropyltriethoxysilane, 3-glycidoxypropylmethyl dimethoxysilane, 3-glycidoxypropylmethyldiethoxysilane, 3-glycidoxypropyltris(methoxyethoxy)silane, 2-(3,4-epoxy cyclohex yl)ethyltrimethoxysilane, 2-(3,4-epoxycyclohexyl)ethyltriethoxysilane, 3-glycidoxypropylphenyl diethoxysilane, methyltrimethoxysilane, methyltriethoxysilane, methyltripropoxysilane, propylethyltrimethoxysilane, ethyltriethoxysilane, vinyltrimethoxysilane, vinyltriethoxysilane, vinyltripropoxysilane, dimethyldimethoxysilane, dimethyldiethoxysilane, vinylmethyldimethoxysilane, vinylmethyldiethoxysilane, phenyltrimethoxysilane, diphenylethoxyvinylsilane, tetramethoxysilane, tetraethoxysilane, tetrapropoxysilane, tetrabutoxysilane, tetraphenoxysilane, tetracetoxysilane, N-(3-acryloxy-2-hydroxypropyl)-3-aminopropyltriethoxysilane, N-(3-acryloxy-2-hydroxypropyl)-3-aminopropyltrimethoxysilane, N-(3-acryloxy-2-hydroxypropyl)-3-aminopropyltripropoxysilane, 3-acryloxypropyldimethylmethoxysilane, 3-acryloxypropyl dimethylethoxysilane, 3-acryloxypropyldimethylpropoxy silane, 3-acryloxypropyl methylbis(trimethylsiloxy)silane, 3-acryloxypropyltrimethoxysilane, 3-acryloxypropyltriethoxy silane, 3-acryloxypropyltripropoxysilane, 3-(meth)acryloxypropyltrimethoxysilane, 3-(meth)acryloxy propyltriethoxysilane, 3-(meth)acryloxypropyltripropoxy silane, N-(2-aminoethyl-3-aminopropyl)trimethoxysilane, N-(2-aminoethyl-3-aminopropyl)triethoxysilane, 3-aminopropyl trimethoxysilane, 3-aminopropyltriethoxysilane, chloropropyltrimethoxysilane, chloropropyltriethoxysilane, trimethoxysilylpropyl diethylenetriamine, etc.; metal alkoxides, for example, aluminum triethoxide, aluminum tripropoxide, aluminum tributoxide, titanium tetraethoxide, titanium tetrapropoxide, titanium tetrabutoxide, zirconium tetraethoxide, zirconium tetrapropoxide, zirconium tetrabutoxide, tin tetraethoxide, tin tetrapropoxide, tin tetrabutoxide, etc.; or complexes of metal alkoxides and -diketones or -ketoesters.

The compound of Formula 3 includes, for example, heptadecafluorodecyltrimethoxysilane, trifluoropropyl trimethoxysilane, perfluorooctyl triethoxysilane, etc.

Likewise, all materials included in the compounds of Formulas 2 and 3 may be used alone or in combinations thereof.

In the present invention, with the goal of preparing the organic-inorganic hybrid material, in the case where a homogeneous or heterogeneous compound, including an organic monomer enabling network formation due to the presence of an organic group substituted for silicon, is used among compounds represented by Formula 2 or 3, it may be polymerized through the addition of a free radical or an organic polymerization initiator or through the ring opening reaction using metal alkoxide or an amine group.

The organic polymerization reaction may be conducted by the addition of the free radical, or cationic or anionic heat or light organic polymerization initiator. In this case, a thermochemical or photochemical monomer, which initiates the polymerization through the formation of heterogeneous elements, is selected from among aluminum alkoxide, zirconium alkoxide, titanium alkoxide, 1-methylimidazole, imidazoles, boron trifluoride diethyl etherate, benzoyl peroxide, 2,2'-azobisisobutyronitrile, and mixtures thereof, but is not limited thereto.

It is possible to prepare the organic-inorganic hybrid material usable in the present invention through condensation, in which the structure and properties of a final material may change depending on the kind of added organic material. The organic material of the organic-inorganic hybrid material functions as a network former and a network modifier in a network structure formed by an oxygen atom. For example, an organic monomer such as a phenyl group or an amine group or an organic material unable to link with an inorganic network structure acts as a network modifier in the organic-inorganic hybrid material. If the added organic material is a glycidoxy group, a methacryl group or a vinyl group, it may function as a network former which forms a new bond through the reaction with another organic monomer or a further organic material in the inorganic network structure.

The organic-inorganic hybrid material used in the present invention is prepared in a solution phase, and thus the initial concentration thereof may easily be varied, in which the ratio of an inorganic network structure and an organic material may be controlled by adjusting their initial concentrations. For instance, in the case where tetramethoxysilane and phenyltrimethoxysilane are used as starting materials, the greater the amount of tetramethoxysilane, the more extensive the inorganic network structure in the final product. On the other hand, the greater the amount of phenyltrimethoxysilane, the greater the amount of organic material. In this way, depending on the kind and amount of starting materials, not only the ratio of inorganic network structure to organic material but also the refractive index and thermooptic coefficient of a final product may be controlled. In particular, the thermooptic coefficient negatively increases as the amount of organic material in the organic-inorganic hybrid material is increased.

The organic-inorganic hybrid material of the present invention may control the thermooptic coefficient through the selection of the starting material. In the case where the organic material in the starting material functions as a network modifier, when it has higher molecular weight, the thermooptic coefficient is negatively increased. That is, when the network modified organic material is an ethyl group other than a methyl group, the thermooptic coefficient shows a larger negative value.

In addition, in the case where the organic-inorganic hybrid material of the present invention includes an organic material that may undergo an organic polymerization reaction, an appropriate initiator is added and then heat or light, such as UV light, is radiated to cause polymerization or formation of networks of organic groups, thus controlling the thermooptic coefficient. Through the polymerization or the formation of networks of the organic materials, the extent of the organic network structure of the organic-inorganic hybrid material becomes large and the thermooptic coefficient is positively increased.

In the present invention, since the organic-inorganic hybrid material is prepared in a liquid phase, an inorganic material or organic material having specific properties may be easily and uniformly added. The added inorganic or organic material functions to control the thermooptic coefficient and, as well, to impart additional properties, due to the properties thereof. For example, when aluminum alkoxide, germanium alkoxide, or zirconium alkoxide is added, the thermooptic coefficient is positively increased, and the refractive index, strength and photosensitivity may also be enhanced. In the case where the organic monomer or silane having a substituted fluorine atom is added, the thermooptic coefficient is greatly negatively increased and the optical waveguide loss and refractive index may be decreased. In addition, when the organic-inorganic hybrid material is added with the dispersion of metal oxide particles, such as silica, boehmite, alumina, or zirconia, in a solvent such as water or alcohol, the thermooptic coefficient of the organic-inorganic hybrid material is positively increased, and the refractive index and strength may also be enhanced.

Further, since the organic-inorganic hybrid material is prepared in a liquid phase and has easily variable viscosity, it may be formed into a film using a relatively easy coating process, such as a spin coating process, a dip coating process, a bar coating process, etc. When the viscosity is changed, the coating film is desirably controlled in its thickness and may become uniform. Therefore, such a coating film is used to fabricate a flexible film optical waveguide comprising a core portion having a high refractive index and a cladding portion formed around the core portion and having a low refractive index, in which the thermooptic coefficient of the core portion is different from that of the cladding portion. Using such an optical waveguide, thermooptic devices, which can control the properties of light to be waveguided, may result.

Upon radiation of light, the molecular modification of the organic monomer and oligosiloxane, constituting the organic-inorganic hybrid material, may occur. Thus, there is difference in molecular weights, shapes, concentrations and chemical potentials before and after the radiation of light. Thereby, when the mold is removed from the light and heat curable organic-inorganic hybrid material, which is cured to be hard, the flexible film optical waveguide may be easily separated, while the organic-inorganic hybrid material does not adhere to the mold.

Below, the process of fabricating a flexible film optical waveguide of the present invention is described, in reference to the drawings.

FIG. 1 illustrates a process of fabricating a flexible film optical waveguide according to a first embodiment and a second embodiment of the present invention, using an organic-inorganic hybrid material.

In the flexible film optical waveguide according to the first embodiment, a lower cladding layer 4 formed of an organic-inorganic hybrid material, having a refractive index lower than that of a core, is provided on a flexible substrate 2. Then, an organic-inorganic hybrid material 3 to be formed into a core, having a refractive index higher than that of the lower cladding layer 4, is applied on the lower cladding layer 4, imprinted using a mold 1 and then cured, to form a core 5 on the lower cladding layer 4 (a micro embossing process).

Unlike the first embodiment, the flexible film optical waveguide according to the second embodiment is fabricated in a manner such that an organic-inorganic hybrid material 3 to be formed into a core, having a refractive index higher than that of the lower cladding layer, is loaded into patterns of a mold 1, adhered on the lower cladding layer 4, and then cured, thereby providing a core 5 on the lower cladding layer 4 (a stamping process).

The flexible substrate used in the present invention is not particularly limited, and may comprise a material selected from among metals, silicon, metal oxides, and organic polymers.

The mold 1 is made of an organic polymer, for example, polymerizable PDMS, or various other materials, such as silicon, quartz, etc. In addition, the mold may be shaped not only in planar form but also in curved form, to be suitable for use in a micro embossing process and a stamping process using a roll.

The flexible polymer substrate 2 and the lower cladding layer 4 are formed using a typical process known in the art. For example, a spin coating process is adopted to form a film having a uniform thickness. The lower cladding layer is formed through a spin coating process and is then cured. Before the solution is applied, a careful process of washing the surface to be applied is required. The washing process is useful for the removal of dust or external impurities negatively affecting the quality of the film. In addition, in order to easily remove the flexible polymer substrate 2, the surface of the substrate is preferably treated using a predetermined material imparting hydrophobicity thereto. Such a material is exemplified by HMDS (1,1,1,3,3,3-hexamethyldisilazane).

The material used for the lower cladding layer has a refractive index lower than the core material, and preferably includes a light or heat curable organic-inorganic hybrid material containing a fluorocarbon group, having a refractive index of 1.46~1.52.

Light at a specific wavelength is radiated onto the mold 1 placed on the lower cladding layer 4 to enable curing of the organic-inorganic hybrid material loaded into the mold. In this case, the light is radiated in the minimum amount that enables photopolymerization by a photosensitive initiator included in the organic-inorganic hybrid material.

After the curing process, the mold 1 is removed from the lower cladding layer 4, thereby obtaining a core layer having a smooth surface. Light used in the curing process has a wavelength range corresponding to UV light. In addition, the core is possible to form even in a curved shape corresponding to the specific shape of the optical waveguide. The core has a refractive index (about 1.53) higher than the lower cladding layer, and is formed of a light or heat curable organic-inorganic hybrid material.

After the core 5 is formed using a micro embossing process or a stamping process, an upper cladding layer 5 is formed. The upper cladding layer may be formed using a spin coating process, like the lower cladding layer. The upper cladding layer may be formed of the same material as the lower cladding layer. Further, since the core may have a size suitable for a single-mode or multi-mode optical waveguide, the upper cladding layer should be applied at one time to various thicknesses. In the case where the upper cladding layer 6 is formed of the same material as the lower cladding layer 4, it has a refractive index from 1.46 to 1.52, and the difference in refractive index between the core and the cladding layer is in the range of 2~5%, thereby providing a flexible film optical waveguide having bending loss of 1 dB/cm or less, that is, little bending loss.

Finally, the flexible polymer substrate 2 is removed from the flexible film optical waveguide formed thereon. As such, in the case where the flexible polymer substrate is surface treated to be hydrophobic as mentioned above, the flexible film optical waveguide may be easily separated.

FIG. 2 illustrates a process of fabricating a flexible film optical waveguide according to third and fourth embodiments of the present invention.

According to the third embodiment, a transparent photosensitive material comprising an organic-inorganic hybrid material having a polymerizable organic functional group doped with a photosensitive initiator is applied on a flexible substrate 11. The flexible substrate 11 and the cladding layer 12 may be formed using a typical process, for example, a spin coating process, for use in the formation of a film having a uniform thickness.

Subsequently, a mask 13 having a predetermined pattern is placed on the cladding layer 12, and light 14 is then radiated to conduct a patterning process. When light is radiated, a desired optical waveguide pattern is formed using light having the wavelength at which the doped photoinitiator begins to react. Commonly, UV light wavelength range is used. In addition, waveguides having various shapes may be fabricated. At this time, a light source usable for light radiation includes electrons, ions, or neutrons, as well as a simple light source. For any starting material, the radiation of particles may be useful to obtain large space resolution.

After the core is formed, a spin coating process is further conducted to a uniform thickness, to form an upper cladding layer (not shown), if necessary.

According to a fourth embodiment of the present invention, a patterning process may be carried out using a laser 15 instead of the mask 13, so that a core pattern is formed between photosensitive organic-inorganic hybrid materials.

The flexible film optical waveguide of the present invention is observed to be stable at room temperature for a period of time of at least 6 months, with only very slightly changed optical properties.

Further, the flexible film optical waveguide thus fabricated can be effectively applied to various optical communication devices and optical connection devices. For application to optical connections, the flexible film optical waveguide may serve as an optical connection device between circuit substrates of electronic parts, including computers, or between display windows and input portions of wireless mobile phones and notebook computers.

A better understanding of the present invention may be obtained in light of the following examples which are set forth to illustrate, but are not to be construed to limit the present invention.

EXAMPLE 1

As a core resin, 13.78 g of 3-methacryloxypropyltrimethoxysilane (Aldrich) and 12.00 g of diphenylsilanediol (Fluka) were mixed together, added with 0.01 g of sodium hydroxide as a catalyst for the acceleration of a siloxane reaction, and then stirred at 80° C. for 6 hr, to obtain a methacryl-phenyl-silica organic-inorganic hybrid material. Separately, as a cladding resin, 13.78 g of 3-methacryloxypropyltrimethoxysilane (Aldrich), 12.00 g of diphenylsilanediol (Fluka), and 5.20 g of heptadecylfluorodecyltrimethoxysilane (Toshiba) were mixed together, added with 0.01 g of sodium hydroxide as a catalyst for the acceleration of a siloxane forming reaction, and then stirred at 80° C. for 6 hr, to obtain a methacrylphenyl-fluorocarbon-silica hybrid material.

To each of the core resin and the cladding resin, BDK as an organic monomer, which is a heat- and photo-sensitive initiator for polymerization, was added in an amount of 1 mol % based on the total amount of alkoxide, and the reaction mixture was further stirred until the organic monomer was completely dissolved, to complete a solution. The cladding solution thus obtained was applied on a PET flexible polymer film using a spin coater, followed by fabricating a desired flexible film optical waveguide using a micro embossing process and a stamping process shown in FIG. 1.

Experimental Example 1

Measurement of Bending Loss

FIG. 3 illustrates the result of a bending experiment conducted on the flexible film optical waveguide fabricated in Example 1. For the experiment, a 180° C. bend was applied, and bending loss was measured while gradually decreasing the bending radius. When the difference in refractive index between the core and the cladding layer of the flexible film optical waveguide was 2%, bending loss before and after the 180° C. bending, varying with the bending radius, were measured. The results are given in Table 1 below. As is apparent from Table 1, it could be seen that no bending loss was observed even when the bending radius was decreased to 2 mm.

TABLE 1

| Bending Radius (mm) | Bending Loss (dB) |
|---|---|
| 20 | 0 |
| 15 | 0 |

TABLE 1-continued

| Bending Radius (mm) | Bending Loss (dB) |
|---|---|
| 10 | 0 |
| 5 | 0 |
| 3 | 0 |
| 2 | 0 |

Experimental Example 2

Measurement of Waveguide Loss

The waveguide loss of the flexible film optical waveguide of Example 1 varying with the length thereof was measured. For the experiment, the flexible film optical waveguide was cut to different lengths and finely polished. The optical photograph of the section thereof is shown in FIG. 4. The measured optical waveguide loss, depending on the variation in length, was confirmed to be about 0.25 dB/cm or less.

Experimental Example 3

Variation in Refractive Index

The difference in refractive index between the methacryl-phenyl-silica organic-inorganic hybrid material as the core resin and the methacrylphenyl-fluorocarbon-silica organic-inorganic hybrid material as the cladding resin in Example 1 was varied. When the difference in the refractive index was maximized, the bending loss of the flexible film optical waveguide could be minimized. For the experiment, a process of varying amounts of a heptadecylfluorodecyltrimethoxysilane precursor for use in the preparation of the cladding resin was conducted. The results are given in Table 2 below. As is apparent from Table 2, the difference in refractive index between the core and the cladding was confirmed to range from 2% to 5%.

TABLE 2

| Heptadecylfluorodecyltrimethoxysilane (mol %) | Difference in Refractive Index between Core and Cladding (%) |
|---|---|
| 10 | 2.0 |
| 12.5 | 3.23 |
| 15 | 4.0 |
| 20 | 4.85 |

Experimental Example 4

Measurement of Light Loss

The flexible film optical waveguide of Example 1 was loaded into an oven. While the temperature was changed from −20° C. to 80° C., variation in light loss of the flexible film optical waveguide was measured. The results are shown in FIG. 5. As shown in this drawing, even though the temperature was changed over a range of 100° C., the light loss was very minimally changed while showing a difference of 2 dB or less at each measuring temperature.

INDUSTRIAL APPLICABILITY

As described hereinbefore, the present invention provides a flexible film optical waveguide using an organic-inorganic hybrid material and a fabrication method thereof. According to the present invention, the flexible film optical waveguide having low waveguide loss, low bending loss in a freely bendable state, and high stability even at high temperatures can be fabricated. Further, the fabrication method is simple, and the flexible film optical waveguide can be inexpensively fabricated on a mass production. The flexible film optical waveguide of the present invention can be applied to optical communication devices or optical connection devices.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of fabricating a flexible film optical waveguide, comprising:

providing a cladding layer formed of an organic-inorganic hybrid material on a substrate;

radiating light onto the cladding layer in a predetermined pattern, to form a core layer having a refractive index higher than that of the cladding layer on the cladding layer; and removing the substrate, wherein the organic-inorganic hybrid material is a polymer having a network structure formed by bonding of an oxygen atom or an organic monomer enabling network formation or network modification to silicon therein, the polymer obtained by condensation of a compound of Formula 1 below with a compound selected from the group consisting of Formula 2 and Formula 3 below:

$R^1R^2Si(OH)_2$  Formula 1

$R^3_aR^4_bM(OR^5)_{(c-a-b)}$  Formula 2

$(OR^6)_nSi-(X-R^7)_m (n+m=4)$  Formula 3 where $R^1$, $R^2$, $R^3$ and $R^4$ are each a linear, branched or cyclic $C_{1\sim12}$ hydrocarbon group having a functional group selected from among an alkyl group, a ketone group, an acryl group, a methacryl group, an allyl group, an alkoxy group, an aromatic group, a halogen group, an amino group, a mercapto group, an ether group, an ester group, a sulfone group, a nitro group, a hydroxy group, a cyclobutene group, a carbonyl group, a carboxyl group, an alkyd group, a urethane group, a vinyl group, a nitrile group, hydrogen, an epoxy group, and mixtures thereof; $R^6$ is a linear or branched alkyl group having 1~10 carbons or a hydrogen atom; X is a carbon chain having 3~6 carbons; $R^7$ is a fluorocarbon having a substituted fluorine atom in a carbon chain having 4~8 carbons or including a vinyl group, a glycidoxy group or a methacryl group; n is a natural number from 1 to 4; m is an integer from 0 to 3; a and b are each an integer from 0 to 3; c is an integer from 3 to 6; M is silicon or metal; and $R^5$ is a linear, branched or cyclic $C_{1\sim12}$ hydrocarbon having a functional group selected from among an alkyl group, an alkoxy group, a ketone group, an aromatic group, and mixtures thereof.

2. The method according to claim 1, further comprising forming upper cladding layer formed of the organic-inorganic hybrid material on the core layer.

3. The method according to claim 1, wherein the substrate comprises a material selected from among metals, silicon, metal oxides, and organic polymers.

4. The method according to claim 1, further comprising applying a release agent on the substrate or surface treating the substrate to be hydrophobic.

5. The method according to claim 1, further comprising curing the optical waveguide using heat or UV light.

* * * * *